United States Patent [19]
Ghaem et al.

[11] Patent Number: 5,495,250
[45] Date of Patent: Feb. 27, 1996

[54] BATTERY-POWERED RF TAGS AND APPARATUS FOR MANUFACTURING THE SAME

[75] Inventors: Sanjar Ghaem, Palatine; William L. Olson, Lindenhurst; Rudyard L. Istvan, Winnetka; George L. Lauro, Lake Zurich, all of Ill.

[73] Assignee: Motorola, Inc., Schaumburg, Ill.

[21] Appl. No.: 143,583

[22] Filed: Nov. 1, 1993

[51] Int. Cl.$^6$ .................................................. G01S 13/08
[52] U.S. Cl. ............................... 342/51; 429/52; 429/124
[58] Field of Search ............................. 342/51; 429/52, 429/63, 113, 110, 124, 126, 162, 163, 185, 192

[56] References Cited

U.S. PATENT DOCUMENTS

| | | | |
|---|---|---|---|
| 4,717,438 | 1/1988 | Benge et al. | |
| 4,730,383 | 3/1988 | Balkanski | 429/124 |
| 4,802,944 | 2/1989 | Benge | |
| 4,842,964 | 6/1989 | Tarcy | 429/52 |
| 4,935,093 | 6/1990 | Reeb | |
| 5,035,965 | 7/1991 | Sangyoji et al. | 429/124 |
| 5,147,985 | 9/1992 | DuBrueg | 429/192 X |
| 5,180,645 | 1/1993 | Moré | 429/127 |
| 5,196,276 | 3/1993 | Niksa et al. | 429/52 |

*Primary Examiner*—Mark Hellner
*Attorney, Agent, or Firm*—Phillip H. Melamed

[57] ABSTRACT

An RF tag (20) includes a low profile battery power source (22). The RF tag includes an electrically insulating substrate 21, an RF transmitter (24) on the substrate for transmitting a predetermined identification code, and the battery (22). The battery includes a first pattern of conductive material to form a planar anode structure (48) and a second pattern of conductive material on the substrate to form a cathode structure (50). A protective layer (92) overlies the substrate. The protective layer includes an opening (94) to expose the anode and cathode of the battery to permit an electrolyte to be applied to the anode and cathode for completing the formation of the battery and to provide electrical energy to the RF transmitter. A manufacturing apparatus (60) is also described which permits the RF tags to be manufactured in a low cost, reel-to-reel, basis. Also described is a dispenser (100) for activating and dispensing the RF tags one at a time at a point of use.

27 Claims, 6 Drawing Sheets

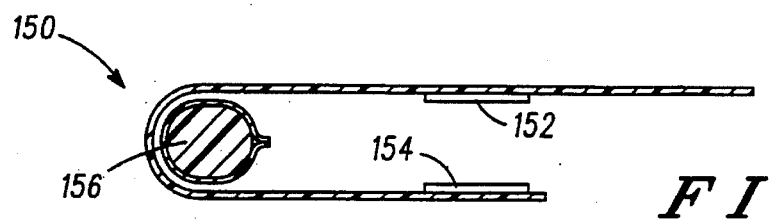
FIG. 13
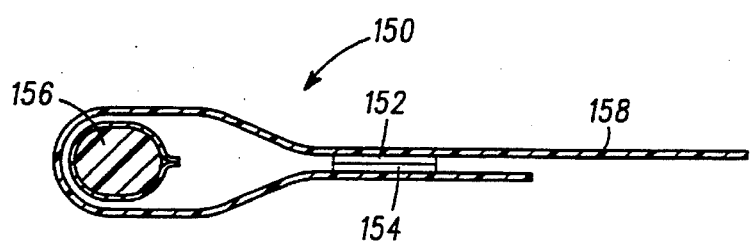
FIG. 14
FIG. 15
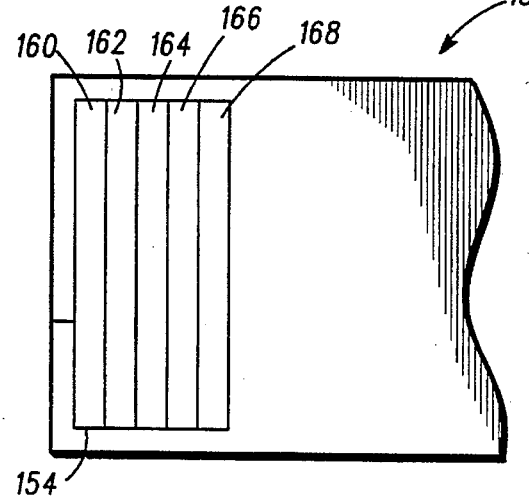
FIG. 16
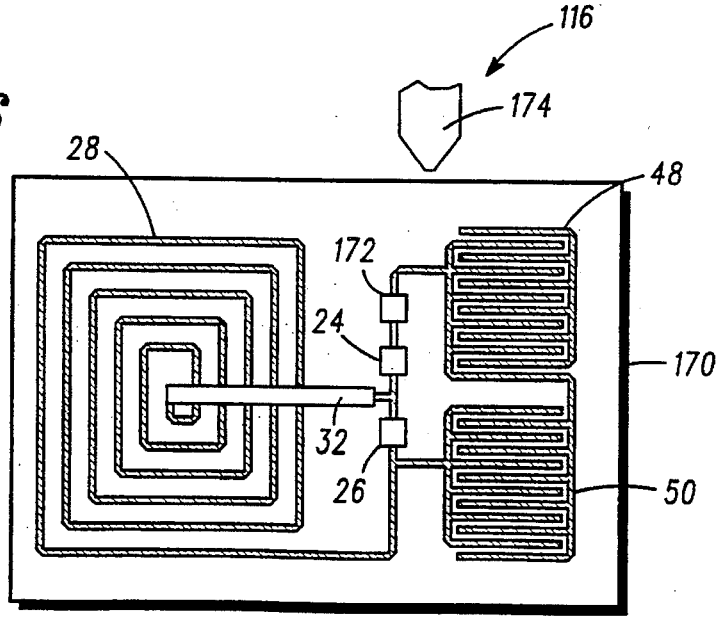

BATTERY-POWERED RF TAGS AND APPARATUS FOR MANUFACTURING THE SAME

BACKGROUND OF THE INVENTION

The present invention is generally directed to an improved RF tag and an apparatus for manufacturing the same. The present invention is more particularly directed to an RF tag including a flexible substrate having formed thereon a transmitter for transmitting a predetermined identification code and a planar electrode structure coupled to the RF transmitter and adapted to receive an electrolyte to form a battery for powering the RF transmitter. The manufacturing apparatus is arranged to mass produce the RF tags on a continuous web basis. The present invention is still further directed to a dispenser for activating and dispensing the RF tags one at a time at a point of use.

RF tags find many different applications ranging from security applications such as electronic article surveillance to detect theft in retail outlets to manufacturing applications such as factory process control to provide information on work completed, parts pedigree, or test data. For security control, rather simple RF tags are employed which transmit RF energy at a single frequency. For manufacturing control, rather sophisticated RF tags may be employed which provide both read and write functions.

Although RF tags are used for a broad range of applications, their penetration into many markets has been limited by at least three factors: tag price; tag size; and tag range. Tag price is dependent upon the number and cost of components used on a tag including the cost of a power source such as a battery which may be required to power many of the components. Tag size is dependent upon the size of a required battery or by the size of a transponder which converts incident RF energy into electrical energy to power the tag. Tag range is dependent upon the output power of a tag reader for tags which derive their electrical energy from the reader through RF coupling and/or upon the capacity of a battery on the tag. Hence, as can be seen from the foregoing, the penetration of RF tags into many markets is largely dependent upon battery characteristics such as cost, size, and capacity.

Current RF tags are presently generally available in three basic forms. These include: passive RF tags; active tags without a battery; and active tags with a battery.

Passive RF tags generally contain a resonant tuned circuit capable of resonating at a single frequency. When the tag is brought into an RF field, it absorbs energy at its resonant frequency. A reader senses the absorption to detect the presence of the tag. Such systems are commonly used for the aforementioned anti-theft detection in retail outlets. These systems are generally short-range systems and generally provide one bit of information corresponding to the single resonant frequency.

Active RF tags without a battery generally contain a small transmitter that derives power from an antenna on the tag that absorbs RF energy transmitted from the tag reader. Energy absorbed by the antenna on the tag is fed into a rectifier bridge and is converted into a DC voltage which is used to power the transmitter on the tag. Although these tags have many advantages over passive tags, they still have limited range due to the small amount of power available through RF coupling from the reader. These tags also suffer from non-uniform range and performance which varies considerably depending upon the operating environment of the tags and the orientation of the tags relative to the reader. All of these factors effect the amount of energy the tag captures from the reader. For tags that are both electrically writable and readable, write range is typically much shorter than the read range because the energy required for programming memory devices is much higher than the energy required for reading.

Active RF tags which include a battery generally solve the problem of limited range and non-uniform performance. The main disadvantage of this type of tag is that generally, only conventional battery energy sources are available which exhibit high cost and size. This limits the utility of active RF tags with a battery since many applications, as for example airline baggage tracking applications, require only a very short tag operating life. RF tags for such applications do not require the amount of power provided by conventional batteries. Further, RF tags for such an application must be relatively thin so that the tags can pass through printers. Unfortunately, conventional batteries do not exhibit such thin dimensions. Lastly, RF tags for such an application must be extremely inexpensive allowing such tags to be disposable after a single use.

From the foregoing, it can be seen that the RF tagging art requires a new and improved RF tag and battery which is of low cost and low profile. Additionally, the battery of such an improved RF tag must be capable of providing sufficient power to power the RF tag active components. However, such a battery should be tailored for providing sufficient power for required, albeit short, periods of time and for a necessary number of read cycles.

The RF tag and power source battery of the present invention provides such an improvement to the art. The RF tag of the present invention can be configured to be very thin given the configuration of the improved battery power source. The battery power source is a planar configuration formed on a tag substrate which may be extremely thin and flexible. The battery generally includes first and second patterns of conductive material formed on the substrate to form the planar electrode structure including an anode structure and a cathode structure coupled to the active components of the RF tag. When necessary, such as, for example, at a point of use, electrolyte may be applied to the electrode structure to complete the formation of the battery for powering the active components of the RF tag and thus, activating the RF tag. The electrolyte may be applied to selected portions of the electrode structure to provide the RF tag with an operating life which is tailored to a given application. Further, the active components may vary from a single-bit transmitter to sophisticated read-write devices rendering flexibility and adapting the RF tag for use in virtually every possible RF tag application.

The RF tag substrate may be formed of inexpensive material. Further, the electrode structure may be formed from inexpensive and environmentally friendly material rendering the RF tags disposable after a single use. Since the RF tag substrate is preferably of flexible material, the apparatus for manufacturing the RF tags is capable of mass producing the RF tags on a low cost, continuous web, reel-to-reel basis.

SUMMARY OF THE INVENTION

The present invention provides a portable power source assembly for providing electrical energy to a portable electronic device. The assembly includes an electrically insulating substrate, a first pattern of conductive material provided on the substrate to form an anode structure, and a second pattern of conductive material provided on the substrate to form a cathode structure. The anode and cathode structures form an electrode structure. The assembly further includes electrolyte applying means for applying an electrolyte to the electrode structure between the anode and cathode structures for forming a battery for providing the electrical energy to the portable electronic device.

The present invention further provides an RF tag assembly including an electrically insulating substrate, an RF transmitter provided on the substrate for transmitting a predetermined identification code, a first pattern of conductive material provided on the substrate to form an anode structure, and a second pattern of conductive material provided on the substrate to form a cathode structure. The anode and cathode structures form an electrode structure coupled to the RF transmitter. The assembly further includes an electrolyte applying means for applying an electrolyte to the electrode structure between the anode and cathode structures for forming a battery for providing electrical energy to the RF transmitter.

The present invention further provides an RF tag assembly including an electrically insulating substrate, an RF transmitter on the substrate for transmitting a predetermined identification code, a first pattern of conductive material on the substrate to form an anode structure, and a second pattern of conductive material on the substrate to form a cathode structure, the anode and cathode structures forming an electrode structure coupled to the RF transmitter. The RF tag assembly further includes a protective layer overlying the substrate. The protective layer has an opening to expose the electrode structure to permit an electrolyte to be applied to the electrode structure for forming a battery to provide electrical energy to the RF transmitter.

The present invention still further provides an RF tagging system including a supply of RF tags, the RF tags being in series along a continuous web with each RF tag comprising a flexible substrate of electrically insulating material, an RF transmitter on the substrate, and an electrode structure on the substrate coupled to its corresponding RF transmitter. The system further includes an RF tag dispenser including a housing for storing the supply of RF tags, electrolyte applying means for applying electrolyte to each electrode structure to form a battery for each RF tag, and a dispensing port for dispensing each RF tag one at a time.

The invention still further provides an RF tagging system including an RF tag including a substrate of electrically insulating material, an RF transmitter on the substrate, a planar battery on the substrate, and interconnect means interconnecting the battery to the RF transmitter, the interconnect means being initially in a high impedance state and responsive to selected incident energy for being converted to a low impedance state. The system further includes activation means for directing the selected incident energy onto the interconnect means to convert the interconnect means to the low impedance state.

The present invention still further provides an apparatus for mass producing RF tag assemblies. The apparatus includes a plurality of process stations arranged in a single line for receiving an elongated web of flexible electrically insulating substrate material, each processing station being dedicated to perform a given process, and advancement means for incrementally advancing the substrate material from each processing station to a next one of the processing stations. The apparatus forms a plurality of the RF tag assemblies linearly aligned and serially arranged on the substrate material one after the other.

BRIEF DESCRIPTION OF THE DRAWINGS

FIG. 13 is a side plan view illustrating the RF tag assembly of FIG. 12 during the use thereof.

FIG. 14 is a side plan view of the RF tag assembly 12 after being activated.

FIG. 15 is a partial top plan view of the RF tag assembly of FIG. 12 illustrating further aspects of the present invention.

FIG. 16 is a top plan view of an RF tag structured in accordance with a further embodiment of the present invention.

DESCRIPTION OF THE PREFERRED EMBODIMENT

Figure 1:
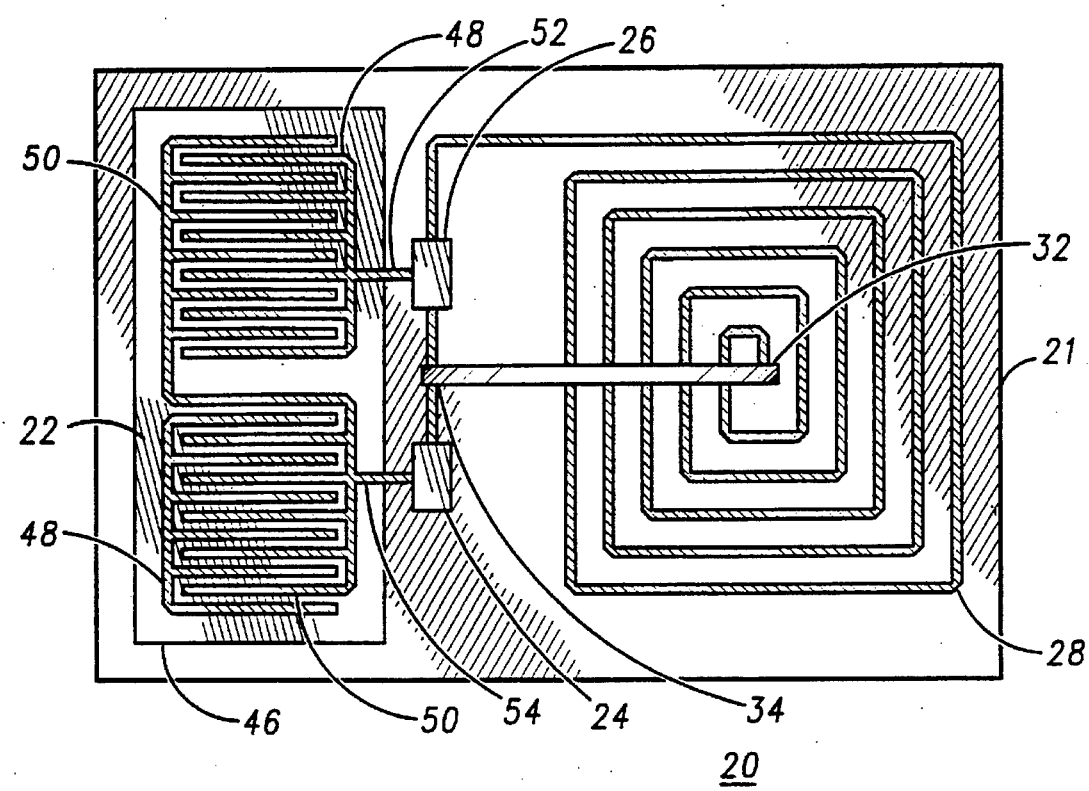
FIG. 1 is a top plan view of an RF tag subassembly embodying the present invention.

Referring now to FIG. 1, it illustrates an RF tag subassembly 20 embodying the present invention which includes a portable power source 22 embodying the present invention. The RF tag subassembly 20 generally includes an insulative substrate 21 and a plurality of components provided on the substrate 21 including an RF receiver/transmitter 24, a tuning capacitor 26, an inductor 28, and the power source 22.

The receiver/transmitter 24 is preferably in integrated circuit form of the type well known in the art which receives an RF interrogation signal at a first frequency and then produces RF energy at a second and different frequency to provide a predetermined identification signal. The RF identification signal may be a continuous signal at a predetermined frequency or the transmitter is preferably programmable to transmit a series of intermittent pulses of RF energy corresponding to one of a plurality of predetermined :identification codes.

The frequency at which the transmitter 24 transmits is determined by the capacitance of the tuning capacitor 26 and the inductance of inductor 28. The inductor 28 also serves as both a receiving antenna for receiving the interrogation signal and a transmitting antenna for radiating the RF energy generated by the transmitter 24.

The tuning capacitor 26 is preferably a chip capacitor of the type known in the art. It is placed onto the substrate 21 after conductive interconnects are formed on the substrate.

The inductor 28, in accordance with this preferred embodiment, is formed in a generally planar spiral configuration on the substrate 21. The inductor 28 and capacitor 26 are coupled together in parallel by conductive interconnects 30 and 32. The inductor 28 and capacitor 26 are also coupled to the transmitter 24 at a common junction 34. As a result, the capacitor 26 and inductor 28 provide a parallel tuned circuit for determining the frequency at which the transmitter 24 generates the identification signal.

Figure 2:
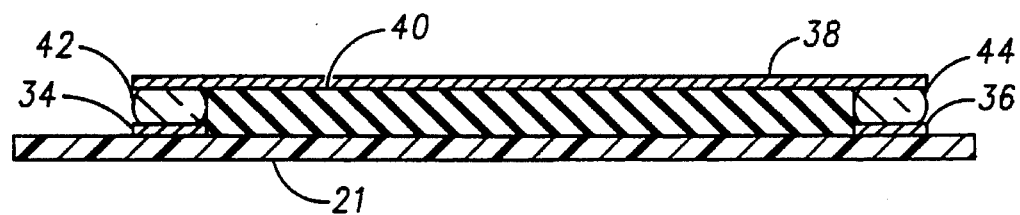
FIG. 2 is a side plan view of a portion of the RF tag subassembly of FIG. 1.

FIG. 2 illustrates the manner in which the center 36 of inductor 28 may be coupled to the common junction 34. Here it will be noted that a conductive foil 38, such as a copper foil, forms the interconnect 32 and carries an insulative strip 40 of, for example, Mylar. The foil 38 is bonded to conductive epoxy contacts 42 and 44 formed on the common junction 34 and the center 36 of inductor 28, respectively. The insulative strip 40 insulates the conductive foil 38 from the windings of the inductor 28 and permits the foil to bridge across the inductor windings to connect the center 36 of inductor 28 to the common junction 34 without shorting the inductor 28.

The power source 22 is formed within a region 46 of substrate 21 which may be recessed from the upper surface of the substrate 21 for reasons to be explained hereinafter. The power source or battery 22 includes a first pattern of conductive material formed on the substrate 21 to form an anode structure 48 and a second pattern of conductive material formed on the substrate 21 to form a cathode structure 50. The anode structure 48 and cathode structure 50 together form an electrode structure for the battery power source 22. Conductive interconnects 52 and 54 couple the anode 48 and the cathode 50 to the receiver/transmitter 24.

When the RF tag subassembly 20 is to be activated, such as at a point of use, an electrolyte is applied to the region 46 containing the electrode structure including the anode 48 and the cathode 50. This completes the formation of the battery 22 and permits the battery 22 to provide electrical power in the form of a DC voltage to the receiver/transmitter 24.

The electrolyte may be in liquid form if the region 46 is recessed to form a reservoir for the electrolyte. In this event, the region 46, after the electrolyte is applied, could be sealed with an adhesive carrying cover laminate of polyethylene or paper to confine the electrolyte within region 46.

Preferably, the electrolyte is highly viscous so as to be in adhesive or gel form. Such electrolytes may be formed from conductive polymers including polyethylene oxide, polypyrrole, polyaniline, polyethylene glycol or polyvinyl alcohol. These polymers may be doped with an ionic conductor and applied to the region 46 by spraying, curtain coating, or transfer printing methods. The mobile ions to serve as the charge carriers in the conductive polymers may be provided by lithium perchlorate, lithium chloride, sodium chloride, or zinc chloride. Preferably, the conductors forming the anode 48 and cathode 50 and the electrolyte are provided with thicknesses on the order of 12 microns.

A variety of conductive inks or metals can be used for forming the anode 48 and cathode 50. The anode 48 is preferably formed from zinc and the cathode 50 is preferably formed from copper. Both of these materials are environmentally friendly. Other materials which may be used for forming the anode 48 and cathode 50 include aluminum, nickel, tin, iron, zirconium, titanium, vanadium, cobalt, manganese, or magnesium. The anode 48 and cathode 50 may be formed by electroplating, ink jet printing, screen printing, or stencil printing onto the substrate 21. The metals used to form the anode 48 and cathode 50 may be dispersed in an organic or inorganic matrix and preferably within a carbon ink to permit ink jet printing of the anode 48 and cathode 50. As will be seen hereinafter, the inductor 28 and the interconnects 30, 52, and 54 may be formed at the same time that the anode 48 and cathode 50 are formed.

The substrate 21 is preferably flexible and of inexpensive material such as paper, woven fibers, or a polymer film such as Mylar, polyethylene, or the like. Such flexible substrate materials are not only inexpensive, but also, by being flexible, lend to the high volume mass production, reel-to-reel manufacturing of the RF tag subassemblies in a manner to be described hereinafter.

Figure 3:
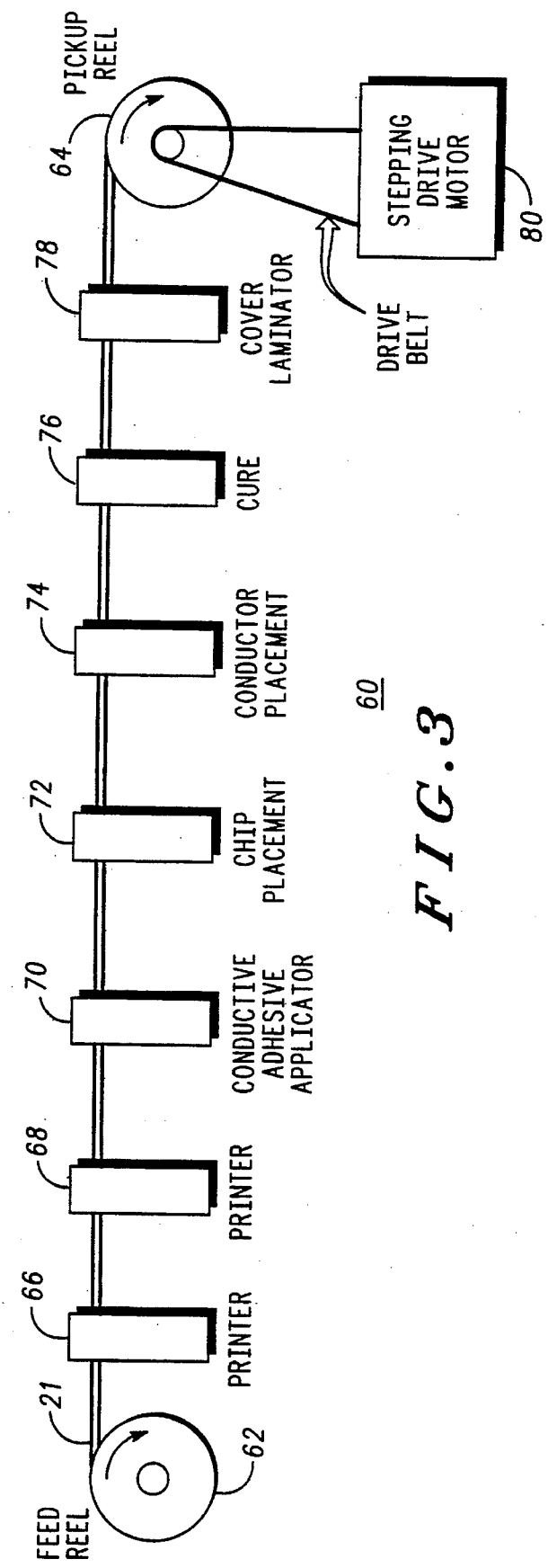
FIG. 3 is a simplified side view of a manufacturing apparatus embodying further aspects of the present invention for manufacturing a plurality of RF tag subassemblies embodying the present invention through a plurality of processing stations on a mass production reel-to-reel basis.

Referring now to FIG. 3, it illustrates an apparatus for mass producing the RF tag subassemblies 20 of FIG. 1. The apparatus 60 generally includes a feed or pay-out reel 62 which stores the substrate material in a continuous web, a pickup or take-up reel 64 for storing the RF tag subassemblies which have been formed on the substrate material 21, a plurality of processing stations 66, 68, 70, 72, 74, 76, and 78 between the pay-out reel 62 and take-up reel 64 and a stepping drive motor 80. The processing stations 66, 68, 70, 72, 74, 76, and 78 are arranged in a single line for receiving the elongated web of flexible, electrically-insulating substrate material 21. Each of the processing stations is dedicated to perform a given process to be described hereinafter. The stepping drive motor 80 incrementally advances the substrate material 21 from each processing station to the next one of the processing stations. As a result, the apparatus 60 forms a plurality of the RF tag subassemblies which are linearly aligned and serially arranged on the substrate material 21 and stores the completed RF tag subassemblies in a roll on the take-up reel 64.

Figure 4:
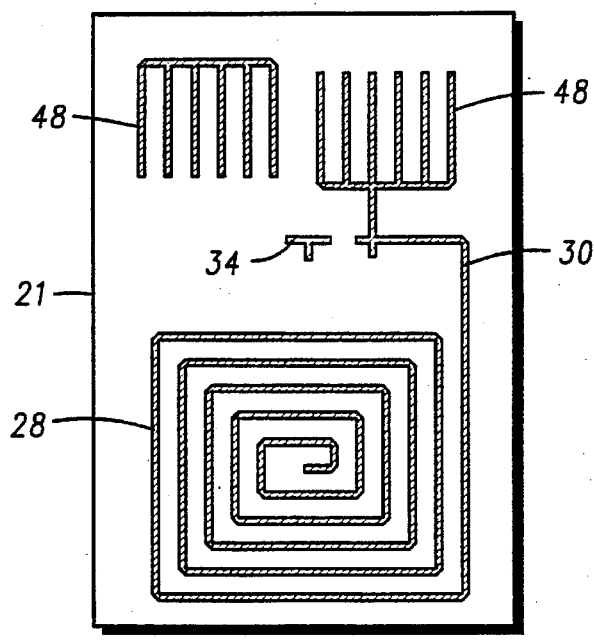
FIG. 4 is a top plan view of a partially completed RF tag subassembly after passing through a first one of the processing stations of the manufacturing apparatus of FIG. 3.

The first processing station 66 comprises a printer. When the substrate material 21 is within the printer 66, the RF tag subassembly being processed is provided with the anode structure 48, the inductor 28, the interconnect 30, and the interconnects forming the common junction 34. When the substrate exits the printer 66, the partially completed RF tag subassembly will appear as illustrated in FIG. 4. In FIG. 4, it will be noted that the substrate 21 has been provided with the inductor 28 having a planar inductance structure, a planar anode structure 48, the interconnect 30 which interconnects the anode to the inductor 28, and the interconnects forming the common junction 34.

Figure 5:
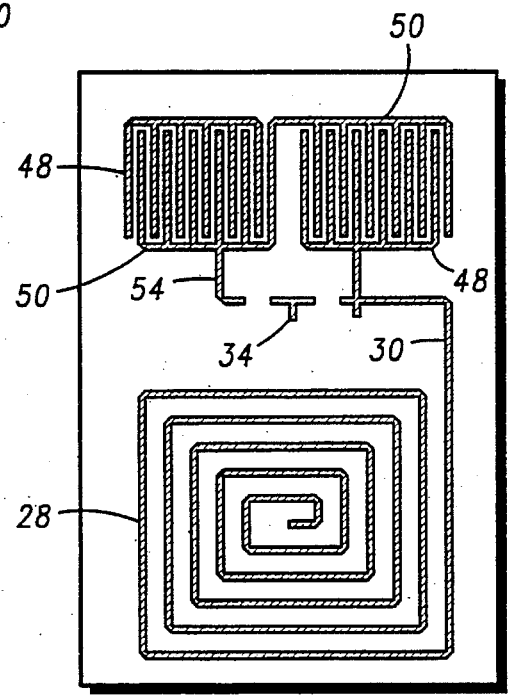
FIG. 5 is a top plan view of a partially completed RF tag subassembly after passing through a second one of the processing stations of the manufacturing apparatus of FIG. 3.

The second processing station 68 also comprises a printer which provides the partially completed RF tag subassemblies with the cathode structure. When the partially completed RF tag subassemblies exit the printer station 68, they appear as illustrated in FIG. 5. In FIG. 5 it will be noted that the planar cathode structure 50 has been added to the partially completed RF tag subassembly along with the interconnect 54.

Figure 6:
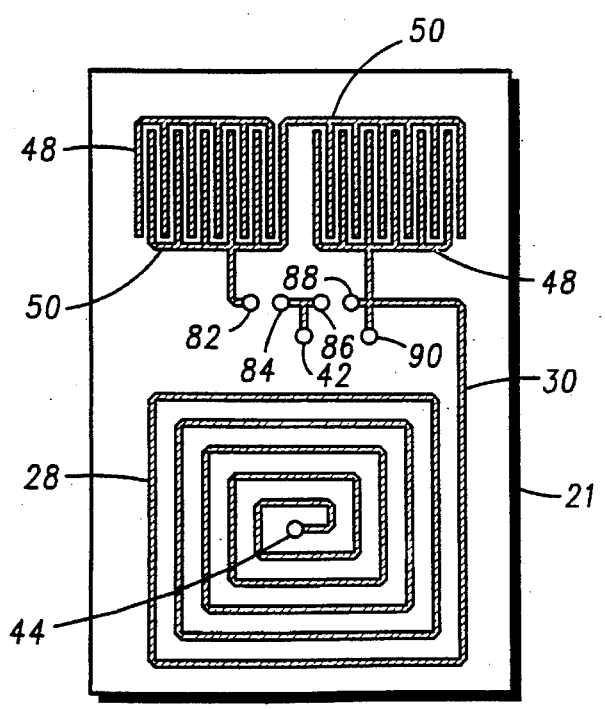
FIG. 6 is a top plan view of a partially completed RF tag subassembly after passing through a third one of the processing stations of the manufacturing apparatus of FIG. 3.

The third processing station 70 comprises a conductive adhesive applicator for applying a conductive adhesive to the interconnects of the partially completed RF tag subassemblies. The conductive adhesive is preferably silver filled epoxy which is curable by heat or ultraviolet radiation. When the partially completed RF tag subassemblies exit the third processing station 70, they will appear as illustrated in FIG. 6. In FIG. 6, it will be noted that the conductive adhesive takes the form of conductive dots including the conductive adhesive 44 at the center of the inductor 28, the conductive adhesive 42 previously described with respect to FIG. 2, and conductive adhesive dots 82 and 84 for receiving the RF receiver/transmitter 24 and conductive adhesive dots 86, 88, and 90 for receiving the chip capacitor 26.

Figure 7:
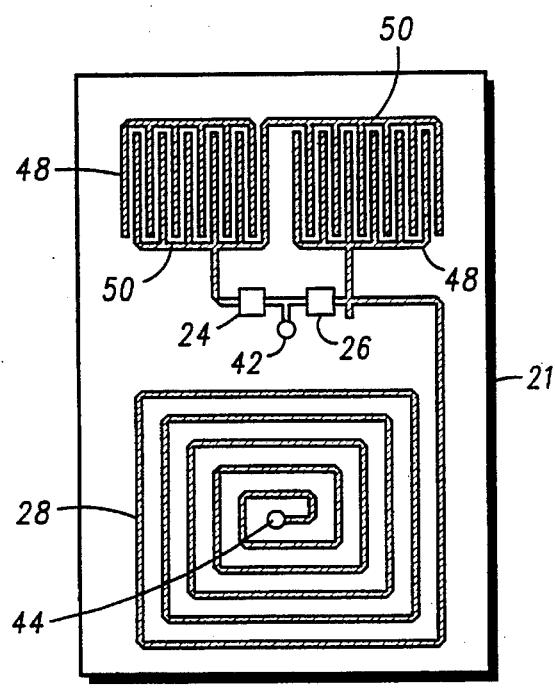
FIG. 7 is a top plan view of a partially completed RF tag subassembly after passing through a fourth one of the processing stations of the manufacturing apparatus of FIG. 3.

The fourth processing station 72 comprises a chip placement station. When the partially completed RF tag subassemblies are within the chip placement station 72, the RF receiver/transmitter integrated circuit 24 is applied to conductive adhesive dots 82 and 84 and the chip capacitor 26 is applied to the conductive adhesive dots 86, 88, and 90. When the partially completed RF tag subassemblies exit the chip placement station 72, they appear as illustrated in FIG. 7. In FIG. 7 it will be noted that the RF receiver/transmitter integrated circuit 24 and the chip capacitor 26 have been added to the partially completed RF tag subassembly.

Figure 8:
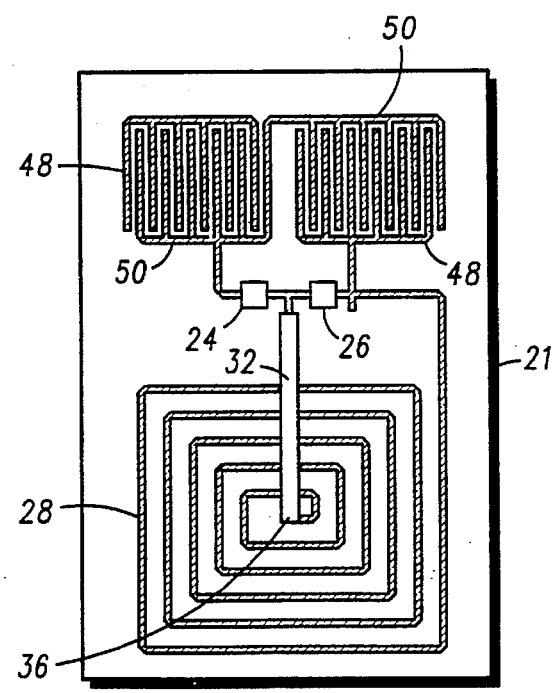
FIG. 8 is a top plan view of a partially completed RF tag subassembly after passing through a fifth one of the processing stations of the manufacturing apparatus of FIG. 3.

The fifth processing station 74 comprises a conductor placement station where the conductive foil is added to the partially completed RF tag subassemblies for coupling the RF receiver/transmitter integrated circuit and the chip capacitor common junction to the center of the inductor 28. This process has been previously described with respect to FIG. 2. Hence, when the partially completed RF tag subassemblies exit the fifth processing station 74, they appear as illustrated in FIG. 8. In FIG. 8 it will be noted that the interconnect bridge 32 has been placed between conductive adhesive dots 42 and 44 for coupling the RF receiver/transmitter integrated circuit 24 and the chip capacitor 26 to the center 36 of the inductor 28.

The RF tag subassemblies are then conveyed to the next processing station 76 which is a curing station. Within station 76 the conductive adhesive dots are cured by being exposed to either thermal or ultraviolet radiation. This causes the conductive adhesive dots to be bonded to the RF receiver/transmitter 24, the chip capacitor 26, and the interconnecting bridge 32.

Figure 9:
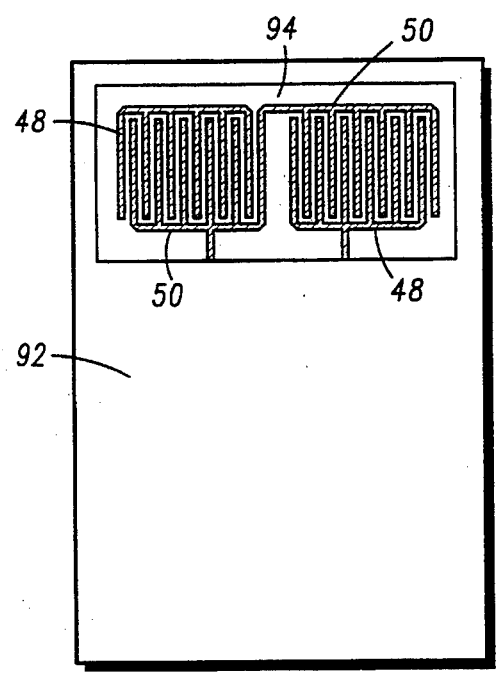
FIG. 9 is a top plan view of a partially completed RF tag subassembly after passing through a sixth one of the processing stations of the manufacturing apparatus of FIG. 3.

The last processing station 78 comprises a cover laminator. In this stage, the RF tag subassemblies are provided with a protective coating which covers the entire RF tag subassembly except for an opening for exposing the electrode structure formed by the anode and cathode. The protective cover may be formed from materials such as paper, woven fibers, or polymer films such as Mylar, polyethylene, or the like. The completed RF tag subassemblies, as they exit the cover laminator 78, will appear as illustrated in FIG. 9. In FIG. 9 it will be noted that a protective cover 92 has been applied over the RF tag subassembly. An opening 94 within the cover 92 exposes the electrode structure formed by the anode 48 and cathode 50.

After exiting the cover laminator station 78, the RF tag subassemblies are then conveyed to the take-up reel and stored as a roll of RF tag subassemblies on the take-up reel 64.

Figure 10:
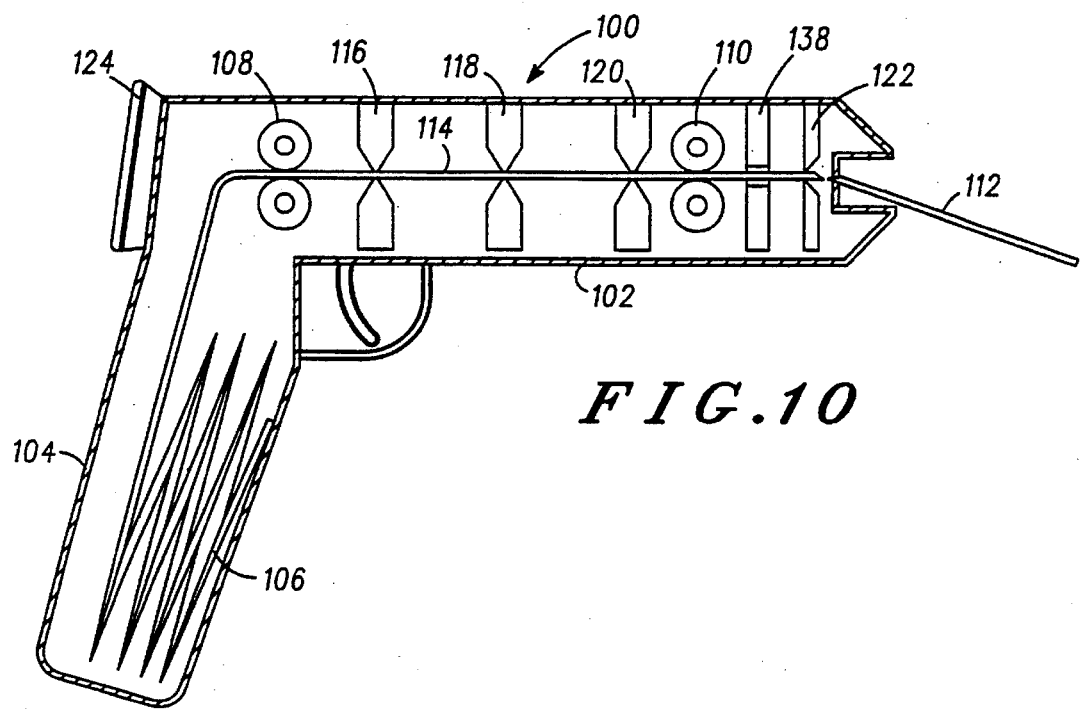
FIG. 10 is a side plan view with portions cut away schematically illustrating a dispenser for dispensing RF tags one at a time.

Referring now to FIG. 10, it illustrates a dispenser 100 for dispensing activated RF tags at, for example, a point of use. The dispenser 100 includes a housing 102 having a handle portion 104 for storing a supply of RF tags 106 to be dispensed from the dispenser 100. Also within the housing 102 are drive rollers 108 and 110 for driving and guiding the RF tags through the dispenser. The RF tags to be dispensed from dispenser 100 preferably take the form of the RF tag illustrated in FIG. 9. As illustrated, one such RF tag 112 is being dispensed from the dispenser 100 while another RF tag 114 is being activated and programmed within the dispenser.

For activating and programming each RF tag, the dispenser includes an activation stage 116, a programming stage 118, a read stage 120 to confirm the programming of the RF tag, and a cutting head 122 to cut the RF tag being dispensed from the continuous web of substrate material upon which the RF tags are formed. The dispenser also includes a keyboard 124 to permit the manual entering of a data code to be loaded into a memory of the RF tag receiver/transmitter which defines the predetermined identification code to be transmitted by an RF tag to be dispensed.

The activation stage 116 may be an electrolyte applicator for applying the electrolyte to the electrode structure of each RF tag to be dispensed to complete the battery thereon to activate each RF tag. As previously described, the applied electrolyte completes the battery of each RF tag so that the active electronics such as the RF receiver/transmitter may be provided with electrical energy from the completed battery.

Figure 11:
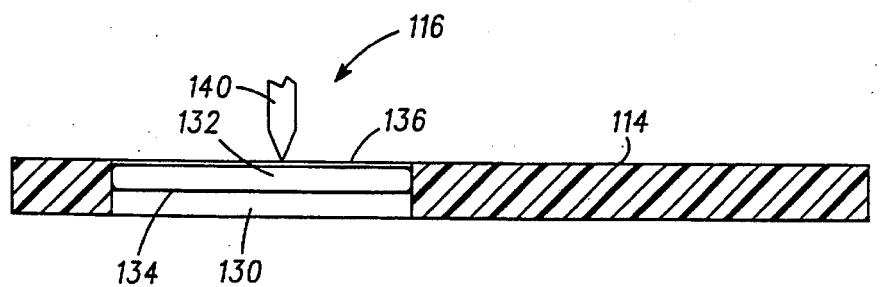
FIG. 11 is a side plan view with a portion cut away illustrating an RF tag embodying further aspects of the present invention.

The activation stage 116 may alternatively take the form of a pressure applicator which exerts pressure against the RF tag battery for activating the RF tag. More specifically, as illustrated in FIG. 11, the RF tag 114 includes a reservoir 130 in which the anode and cathode are formed to form the electrode structure. Above the reservoir 130 is a supply of electrolyte 132 which is separated from the reservoir 130 by a membrane 134. When the reservoir 130 is aligned with the activation stage 116, the activation stage 116 applies pressure to the RF tag for rupturing the membrane 134 and permitting the electrolyte to flow into the reservoir 130 for completing the battery and activating the RF tag. Preferably, the membrane 134 is thin enough so that upon the pressure being applied, the membrane 134 is ruptured while a cover laminate 136 remains intact. This permits the RF tag to be activated while confining the electrolyte within the reservoir 130. To that end, FIG. 11 also shows the activation stage 116 including a pressure exerting member 140 for exerting the pressure against the cover laminate 136 and the membrane 134 for rupturing the membrane and permitting the electrolyte to flow into the reservoir 130 which includes the aforementioned electrode structure of the battery.

Referring again to FIG. 10, once the RF tag is activated, the programmer 118, which is preferably aligned with the RF receiver/transmitter of the RF tag, enters into the memory (not shown) of the RF receiver/transmitter the predetermined identification code of the RF tag. As the RF tag 114 is driven in a forward direction to be dispensed, the reader 110 reads the predetermined identification code for purposes of confirmation. When the RF tag to be dispensed reaches the position shown with respect to the RF tag 112, the cutter 122 cuts the RF tag to be dispensed from the continuous web to provide an RF tag to be applied at its point of use.

In addition to the components of the RF tag dispenser described above, the RF tag dispenser 100 may further include a printer 138 for printing a visible indication code onto each RF tag before it is dispensed. Such a visible identification code may be preferable for airline baggage applications or the like.

Figure 12:
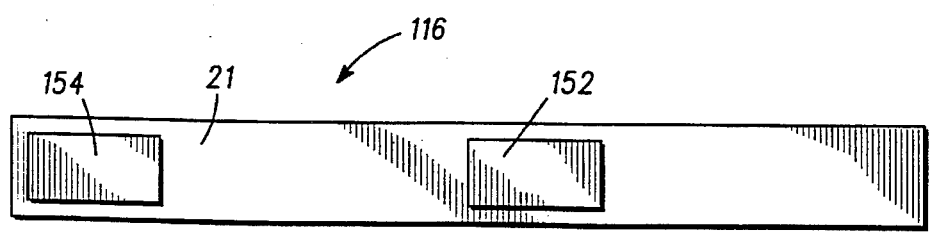
FIG. 12 is a top plan view of an RF tag assembly embodying the present invention.

Referring now to FIG. 12, it illustrates an RF tag which may be utilized to advantage in an airline baggage tagging system or the like. The RF tag 150 may include all of the structure previously described with respect to the RF tag of FIG. 9. To that end, the RF tag 150 includes an electrode structure 152 which may take the form of the anode 48 and cathode 50 illustrated in FIG. 9. The RF tag 150 also includes on the substrate 21 a reservoir 154 of electrolyte wherein the electrolyte is of the type previously described which has adhesive qualities. The substrate 21 of the RF tag 150 is elongated with the electrode structure 152 separated from the electrolyte 154 to permit the flexible substrate 21 to be bended at a point intermediate the electrode structure 152 and the electrolyte 154 as illustrated in FIG. 13 to permit the RF tag 150 to be attached to a member 156 such as the handle of a suitcase, for example. With the tag 150 being thus bended around the handle 156, the electrolyte reservoir 154 is in coextensive alignment with the electrode structure 152.

As illustrated in FIG. 14, the electrolyte reservoir 154 is brought into engagement with the electrode structure 152 to apply the electrolyte to the electrode structure 152 and to thus complete formation of the battery. At this point, the RF tag is activated at its point of use. As also illustrated in FIG. 14, the RF tag includes an extension 158 which may include the aforementioned visible identification code.

Referring now to FIG. 15, it illustrates a modification which may be made to the RF tag 150 of FIG. 12 in accordance with further aspects of the present invention. Here, the electrolyte reservoir 154 is segmented by a segmented cover including segments 160, 162, 164, 166, and 168. If it is desired to have the RF tag 150 to be activated for a preselected limited time period, a suitable number of the cover segments 160, 162, 164, 166, and 168 may be removed for selecting selected reservoir segments. In doing so, preselected limited activation time periods may be selected for the RF tag 150.

Referring now to FIG. 16, it illustrates another RF tag 170 embodying the present invention. The RF tag 170 is shown without its cover laminate so as to expose the internal components thereof. The RF tag 170 is identical to the RF tag illustrated in FIG. 9 except that it further includes an interconnect 172 for interconnecting the battery to the RF transmitter 24, wherein the interconnect 172 is initially in a high impedance state and is responsive to a selected incident energy for being converted to a low impedance state for activating the RF tag 170. The interconnect, in accordance with this preferred embodiment, may be formed of an anisotropic conductive adhesive material which, responsive to heat and pressure provided by a heated bar 174 of the activation stage 116, is converted from the high impedance state to the low impedance state for activating the RF tag 170. This of course permits the electrolyte to have already been applied to the anode 48 and cathode 50 of the battery prior to activation. When the heat and pressure are applied to the interconnect 172, the interconnect 172 is converted from the high impedance state to the low impedance state for effectively coupling the battery to the RF receiver/transmitter 24. As a result, the heat bar 174 activates each RF tag 170 prior to being dispensed.

From the foregoing, it can be seen that the present invention provides a new and improved RF tag and a battery for use therewith which permits the RF tags to be used for virtually every RF tagging application. The RF tags are formed on inexpensive and flexible substrate material to permit the mass production of the RF tags on a high volume, low unit cost, reel-to-reel basis. Additionally, all of the components of the RF tags may be formed from environmentally friendly material rendering the RF tags readily disposable after a single use. Further, since the battery of each RF tag is activated at a point of use, battery life is assured for each RF tag application.

As can be further seen from the foregoing, the improved battery power source is low profile. This permits a low cost, low profile RF tag to be produced which will operate for required periods of time and the required number of transmission cycles of its identification code. Further, extreme flexibility is provided in configuring the battery to provide various different voltages and currents while retaining the planar configurations of the battery.

Hence, the RF tag of the present invention specifically addresses the needs of the prior art with respect to RF tag price, RF tag size, and RF tag range. As a result, the RF tag of the present invention is adaptable for use in virtually every RF tag application.

While particular embodiments of the present invention have been shown and described, modifications may be made, and it is therefore intended in the appended claims to cover all such changes and modifications which fall within the true spirit and scope of the invention.

What is claimed is:

1. A portable power source assembly for providing electrical energy to a portable electronic device, said assembly comprising:

an electrically insulating substrate;

a first pattern of conductive material provided on said substrate to form a planar anode structure;

a second pattern of conductive material provided on said substrate to form a planar cathode structure, said anode and cathode structures forming a planar electrode structure; and electrolyte applying means for applying an electrolyte on top of said planar electrode structure between said planar anode and cathode structures for forming a battery for providing said electrical energy to said portable electronic device.

2. An assembly as defined in claim 1 wherein said applying means includes means for applying said electrolyte to a selected portion of said electrode structures whereby said formed battery provides said electrical energy to said portable electronic device for a preselected limited time period.

3. An assembly as defined in claim 1 wherein said applying means comprises an electrolyte reservoir holding said electrolyte and wherein said reservoir is in coextensive alignment with said electrode structures when applying said electrolyte to form said battery.

4. A portable power source assembly for providing electrical energy to a portable electronic device, said assembly comprising:

an electrically insulating substrate;

a first pattern of conductive material provided on said substrate to form an anode structure;

a second pattern of conductive material provided on said substrate to form a cathode structure, said anode and cathode structures forming an electrode structure: and electrolyte applying means for applying an electrolyte to said electrode structure between said anode and cathode structures for forming a battery for providing said electrical energy to said portable electronic device; wherein said applying means comprises a reservoir for holding said electrolyte and wherein said reservoir is in coextensive alignment with said electrode structures when applying said electrolyte to form said battery: and wherein said reservoir is divided into discrete segments, and wherein said applying means includes means for selecting respective ones of said reservoir segments for applying said electrolyte to corresponding respective portions of said electrode structures whereby said formed battery provides said electrical energy to said portable electronic device for a preselected limited time period.

5. An RF tag assembly comprising:

an electrically insulating substrate;

an RF transmitter provided on said substrate for transmitting a predetermined identification code;

a first pattern of conductive material provided on said substrate to form a planar anode structure;

a second pattern of conductive material provided on said substrate to form a planar cathode structure, said anode and cathode structures forming a planar electrode structure coupled to said RF transmitter; and electrolyte applying means for applying an electrolyte on top of said planar electrode structure between said planar anode and cathode structures for forming a battery for providing electrical energy to said RF transmitter.

6. An assembly as defined in claim 5 wherein said applying means includes means for applying said electrolyte to a selected portion of said electrode structures whereby said formed battery provides said electrical energy to said portable electronic device for a preselected limited time period.

7. An assembly as defined in claim 5 wherein said applying means comprises an electrolyte reservoir holding said electrolyte and wherein said reservoir is in coextensive alignment with said electrode structures when applying said electrolyte to form said battery.

8. An RF tag assembly comprising:

an electrically insulating substrate;

an RF transmitter provided on said substrate for transmitting a predetermined identification code;

a first pattern of conductive material provided on said substrate to form an anode structure;.

a second pattern of conductive material provided on said substrate to form a cathode structure, said anode and cathode structures forming an electrode structure coupled to said RF transmitter; and electrolyte applying means for applying an electrolyte to said, electrode structure to said anode and cathode structures for forming a battery for providing electrical energy to said RF transmitter, wherein said applying means comprises a reservoir for holding said electrolyte and wherein said reservoir is in coextensive alignment, with said electrode structures when applying said electrolyte to form said battery; and wherein said reservoir is divided into discrete segments, and wherein said applying means includes means for selecting respective ones of said reservoir segments for applying said electrolyte to corresponding respective portions of said electrode structures whereby said formed battery provides said electrical energy to said portable electronic device for a preselected limited time period.

9. An RF tag assembly as defined in claim 7 wherein said substrate is an elongated substrate formed of flexible material, wherein said applying means and said electrode structures are separated on said substrate, and wherein said substrate is bendable intermediate said applying means and said electrode .structure for bringing said applying means into engagement and said coextensive alignment with said electrode structure.

10. An RF tag assembly as defined in claim 9 wherein said electrolyte forms adhesive means for maintaining said applying means and said electrode structure in engagement and to configure said substrate in a loop for attaching said RF tag to an article.

11. An RF tag subassembly comprising:

an electrically insulating substrate;

an RF transmitter on said substrate for transmitting a predetermined identification code;

a first pattern of conductive material on said substrate to form an anode structure;

a second pattern of conductive material on said substrate to form a cathode structure, said anode and cathode structures forming an electrode structure coupled to said RF transmitter; and a protective layer overlying .said substrate, said protective layer having an opening to expose said electrode structure to permit an electrolyte to be applied to said electrode structure for forming a battery to provide electrical energy to said RF transmitter.

12. An RF tagging system comprising:

a supply of RF tags, said RF tags being in series along a continuous web, each said RF tag comprising a flexible substrate of electrically insulating material, an RF transmitter on said substrate, and an electrode structure on said substrate coupled to its corresponding RF transmitter; and an RF tag dispenser including a housing for storing said supply of RF tags, electrolyte applying means for applying electrolyte to each said electrode structure to form a battery for each said RF tag, and a dispensing port for dispensing each said RF tag one at a time.

13. An RF tagging system as defined in claim 12 wherein each said RF transmitter is programmable for transmitting a predetermined identification code and wherein said dispenser further includes programming means for programming each said RF transmitter after applying said electrolyte to each said electrode structure.

14. An RF tagging system as defined in claim 13 wherein each said RF tag further includes a supply of electrolyte and wherein said applying means includes means for releasing said electrolyte from each said supply of electrolyte onto its corresponding electrode structure.

15. An RF tagging system as defined in claim 12 wherein said dispenser further includes printing means for printing a visible identification code onto each said RF tag.

16. An RF tagging system comprising:

an RF tag comprising a substrate of electrically insulating material, an RF transmitter on said substrate, a planar battery on said substrate, and interconnect means interconnecting said battery to said RF transmitter, said interconnect means being initially in a high impedance state and responsive to selected incident energy for being converted to a low impedance state; and activation means for directing said selected incident energy onto said interconnect means to convert said interconnect means to said low impedance state.

17. An RF tagging system as defined in claim 16 wherein said interconnect means is formed from an anisotropic conductive adhesive material and said activation means provides heat and pressure.

18. An RF tagging system as defined in claim 17 wherein said activation means comprises a heated bar.

19. An RF tagging system as defined in claim 16 further including a plurality of said RF tags, said RF tags being in series along a continuous web to form a supply of said RF tags, wherein said RF tag substrates are formed from flexible material, and wherein said system further includes an RF tag dispenser including a housing for storing said supply of RF tags, said activation means for converting each said interconnect means to said low impedance one at a time, and a dispensing port for dispensing each said RF tag one at a time.

20. An RF tagging system as defined in claim 19 wherein each said RF transmitter is programmable for transmitting a predetermined identification code and wherein said dispenser further includes programming means for programming each said RF transmitter after applying said electrolyte to each said electrode structure.

21. An RF tagging system as defined in claim 19 wherein said dispenser further includes printing means for printing a visible identification code onto each said RF tag.

22. An assembly as defined in claim 1 wherein said anode and cathode structures each comprise metalization projections on said substrate and wherein said anode metalization projections are adjacent to and interdigitated with said cathode metalization projections.

23. An assembly as defined in claim 5 wherein said anode and cathode structures each comprise metalization projections on said substrate and wherein said anode metalization projections are adjacent to and interdigitated with said cathode metalization projections.

24. A portable power source assembly for providing electrical energy to a portable electronic device, said assembly comprising:

an electrically insulating substrate;

a first pattern of conductive material provided on said substrate to form a planar anode structure;

a second pattern of conductive material provided on said substrate to form a planar cathode structure, said anode and cathode structures forming a planar electrode structure; and a protective layer overlying said substrate, said protective layer having an opening to expose said planar electrode structure to permit an electrolyte to be applied to said electrode structure for forming a battery to provide electrical energy.

25. An assembly as defined in claim 24 wherein said anode and cathode structures each comprise metalization projections on said substrate and wherein said anode metalization projections are adjacent to and interdigitated with said cathode metalization projections with at least a portion of said interdigitated metalization projections aligned with said opening and thereby exposed to permit application of said electrolyte thereto.

26. An RF tag subassembly comprising:

an electrically insulating substrate;

circuitry, coupled to said substrate and receiving electrical energy from a battery, for providing a predetermined identification code;

a first pattern of conductive material provided on said substrate to form a planar anode structure;

a second pattern of conductive material provided on said substrate to form a planar cathode structure, said anode and cathode structures forming a planar electrode structure; and a protective layer overlying said substrate, said protective layer having an opening to expose said planar electrode structure to permit an electrolyte to be applied to said electrode structure for forming said battery to provide electrical energy for said circuitry.

27. An assembly as defined in claim 26 wherein said anode and cathode structures each comprise metalization projections on said substrate and wherein said anode metalization projections are adjacent to and interdigitated with said cathode metalization projections with at least a portion of said interdigitated metalization projections aligned with said opening and thereby exposed to permit application of said electrolyte thereto.

* * * * *